3,079,303
BASIC TABLET GRANULATION AND PROCESS
OF USING SAME
Allan M. Raff, Glenside, Pa., Manford J. Robinson, Moorestown, N.J., and Edward V. Svedres, Penn Valley, Pa., assignors to Smith Kline & French Laboratories, Philadelphia, Pa., a corporation of Pennsylvania
No Drawing. Filed Dec. 11, 1958, Ser. No. 779,552
8 Claims. (Cl. 167—82)

This invention relates to a novel basic tablet granulation and a rapid and inexpensive process for preparing tablets using the same Prior to this invention the two methods of making tablets were the wet granulating process and the slugging method otherwise called double compression. These methods are lengthy, expensive, dusty and inflexible in that once a granulation is made for a specific active ingredient it cannot be used for other active ingredients. For example, to prepare a wet granulation the following time consuming steps are necessary: Reduction of particle size of the (ingredients, preparation of the granulating solution or binder, weighing and mixing the separate ingredients, granulating (moistening powdered ingredients with water or a binding agent in solution), screening the wet mass (forcing the moistened materials through a screen of proper mesh to form granules which will dry readily), drying granulation, screening after drying to reduce the dried granulation to the final and proper size most suitable for compressing.

Another big drawback of using the two conventional methods of preparing granulations are the difficulties often encountered when manufacturing tablets. These difficulties are capping which is caused by the excess of "fines" or fine powder in the granulation which traps the air, the incorporation of thermolabile (vitamins) and/or moisture labile (acetylsalicylic acid) materials, mottling (spotting) during coloring of the tablets and batch to batch color variation and finally, high moisture content of the finished granulation which gives short shelf life to moisture sensitive products.

The novel granulations prepared by the method of this invention overcome all these disadvantages. In accordance with this invention it is possible to prepare rapidly and inexpensively a superior granulation having uniform particle size, lower moisture content and perfect color distribution which then may simply be admixed with any active ingredient.

The method of this invention is much more rapid because the following steps are eliminated: reduction of particle size, preparation of granulating solution, granulating, screening of wet mass, drying and screening of dry material.

The uniform particle size and free flowing granules obtained from this procedure of preparing granulations gives better weight and size control of compressed tablets and eliminates capping and chipping.

Preparing a slurry of the ingredients is very advantageous in that a much more homogeneous mixture is obtained and when colored tablets are desired the dyes are mixed in a liquid state with the other ingredients making it possible for uniform color distribution. If pigments (insoluble dyes) are to be used as a preferred variation of the process they can be mixed with an uncolored granulation and because of the uniform particle size of the granulation perfect color distribution is obtained. This overcomes the disturbing problems of mottling and the batch to batch color variation.

Another major advantage of the granulations produced by the process of this invention is the very low moisture content of the finished granulation which results in an extended shelf life of the medicament form. This low moisture content of the granulation also greatly reduces incompatibilities of labile ingredients such as ascorbic acid and iron or acetylsalicylic acid often encountered in the tablet manufacturing processes of the prior art.

Still other advantages of this novel process of preparing basic tablet granulations are: The use of these granulations produce tablets with exceptional hardness and sheen. This surface characteristic permits a dust free tablet. There is no dust in the atmosphere during processing. Much less lubricant is required thus giving better disintegration time to the tablet. A hard tablet may be achieved with very little compressional force resulting in a much longer tool and tablet press life. Finally, the use of this placebo tablet granulation leads to increased flexibility. It is possible to use the same granulation for any active medicinal ingredient. Scheduling in tablet production is simplified because it is possible to shift from one tablet strength to another, or from one product to another on short notice. It is only necessary to add the new active ingredient to a standard granulation rather than develop a new granulation.

In accordance with the process of the present invention, a slurry is prepared containing a filler (excipient), distintegrant and binder in a liquid vehicle. When desired to produce a colored basic granulation a coloring agent is added to this slurry. The slurry is then spray dried to form dry particles comprising the filler and distintegrant substantially coated with the binder. The spray drying is carried out in an apparatus conventionally used for spray drying. The resultant material is then a finished granulation which is mixed at any desired time with an active medicinal ingredient and, when necessary, lubricant. The mixture is then compressed into a formed unit on a tablet press.

More specifically the initial step of preparing the granulation consists of measuring the liquid vehicle into a vessel of the proper size. Using a mixer, the binding agent is dissolved by agitation in the liquid vehicle. To this solution the distintegrant is added while the slurry is agitated. Finally the filler is added with continuous agitation of the slurry. The slurry is allowed to mix until homogeneous. In order to prevent settling of the heavier particles the slurry must be continuously agitated throughout the operation.

The slurry is then fed into a spray dryer. Preferably the outlet temperature will be from about 25° C. below the boiling point of the liquid vehicle to about 25° C. above the boiling point of the liquid vehicle, advantageously about 5° C. above the boiling point of the liquid vehicle. Correspondingly the inlet temperature will be higher than the outlet temperature and advantageously will be as high as the limitations of the equipment will permit. Desirably during the course of operation the inlet and outlet temperatures remain substantially constant. The dried granulation is collected in a receiver at the bottom of the main chamber.

The solids concentration of the slurry will be from about 5% to about 75% and preferably from about 50% to about 60% by weight.

The liquid vehicle used in preparing the slurry or suspension will be low boiling, having a boiling point from about 35° C. to about 150° C. Exemplary of such low boiling liquid vehicles are for example, water, a lower aliphatic alcohol, such as, for example, methyl, ethyl or isopropyl alcohol; a di lower alkyl ketone, preferably those having not in excess of 4 carbons such as, for example, acetone or methyl ethyl ketone; ether, diethyl ether; aromatic solvents such as for example benzene, toluene, xylene; carbon tetrachloride or chloroform. When a binder employing a gum is used, water is the preferred liquid for preparing the slurry.

The pharmaceutical filler or excipient to be used can be any known to the art of tableting. The filler is present from about 50 to about 98% by weight of the total solids of the slurry described above. Preferably the filler is present from about 80 to about 95% by weight of the total solids. Exemplary of the more common fillers are precipitated calcium carbonate, kaolin, lactose, powdered sugar, magnesium carbonate, barium sulfate, diatomaceous earth and the preferred calcium sulfate dihydrate. The calcium sulfate dihydrate is particularly advantageous because it is inexpensive. Calcium sulfate dihydrate is a poor excipient when the conventional methods of granulation are employed because it lacks adhesiveness and because its basic nature sometimes affects stability of acid salts. The process of this invention eliminates these undesirable characteristics of calcium sulfate dihydrate and allows the use of such an inexpensive filler.

The binder constituent used in the process of this invention is present from about 1 to about 20% by weight of the total solids. Preferably the binder is present from about 2 to about 10% by weight of the total solids. The binders used are natural gums and gum constituents, cellulose esters, polyvinyl alcohol, polyvinylpyrrolidone and proteinaceous material. Exemplary of natural gums and gum constituents thereof are acacia, tragacanth, sodium alginate, agar, chondrus, arabic acid, bassorin, karaya, carragennin and pectin.

Exemplary of cellulose esters are a lower alkyl cellulose, such as, for example, methyl or ethyl cellulose, carboxy lower alkyl cellulose, such as for example, carboxyethylcellulose, carboxymethylcellulose, a hydroxy lower alkyl cellulose, such as, for example, hydroxy methyl cellulose or hydroxy ethyl cellulose, cellulose esters formed with organic acids, such as, for example, cellulose acetate hydrogen phthalate, ammonium cellulose acetate phthalate, cellulose acetate butyrate, cellulose acetate sodium phthalate and cellulose acetate potassium phthalate, an alkali metal sale of a cellulose ester formed with an inorganic acid, such as, for example, sodium cellulose sulfate and potassium cellulose sulfate. Exemplary of proteinaceous material is casein, gelatin and zein.

The advantageous binders are the natural gums and gum constituents, as for example, acacia, tragacanth, agar and pectin.

The disintegrating agent is present from about 1 to 50% by weight of the total solids, the preferable range being from 3 to 20% by weight of the total solids. The material used as disintegrating agents is any natural or synthetic water insoluble, water swelling material such as purified wood cellulose, starch, flour, alginic acid, guar gum and acid carboxymethylcellulose.

When a lubricant is advantageously used in this process it can be for example any of the more common tablet lubricants, such as, talc, powdered stearic acid, magnesium stearate, sodium stearate, calcium stearate, boric acid, sodium benzoate or combinations thereof. The lubricant is present from about 0.1 to 5% by weight of the total solids, preferably from about 1 to 3% by weight.

The granulation of the thus outlined process comprises substantially spherical dry granules comprising a filler and a disintegrant coated with one of the above mentioned binders. The particle size of the granulation is from about 5 to 2000 microns and preferably from about 100 to about 250 microns. The binder coating material in the finished granulation is from about 1% to about 20% and preferably from about 3% to about 10% by weight of the material which is coated.

The finished granulation formed from the above invention is now tableted by mixing the desired powdered medicament with the above formed basic granulation in any suitable mixer and a lubricant such as magnesium stearate is optionally added. The granulation is now ready for compression. It may be compressed on a single punch, rotary or double rotary tablet press.

It is evident that this basic granulation can be used to make a tablet containing any solid medicament, as for example, acetophenetidin, acetylsalicylic acid, amobarbital, amphetamine sulfate, dextro-amphetamine sulfate, ascorbic acid, atropine sulfate, chlorpromazine, codein, digitalis, digitoxin, ferrous sulfate, folic acid, homatropine methylbromide, hydrocortisone, isoniazid, methenamine morphine sulfate, neomycin sulfate, nicotinamide, nicotinic acid, penicillin, phenobarbitol, polymyxin B sulfate, prochlorperazine, potassium chloride, potassium permanganate, promethazine, quinine sulfate, riboflavin, saccharin, sodium bicarbonate, sodium chloride, tetracycline hydrochloride, thyroid, vitamin $B_{12}$ and many vitamin combinations.

The ratio of medicament to basic granulation is desirably from about 0.5 to 1 to about 5 to 1, advantageously from about 1 to 1 to about 3 to 1. The upper limit of the percent weight of medicament in the finished tablet is critical and in most cases will not exceed 90% of the finished tablet weight. The lower limit is less critical and can be as low as 1% or less.

The most advantageous ratio of the basic tablet granulation formed in accordance with this invention to active ingredient varies widely depending upon the physical characteristics of the active ingredient, i.e., granular, fluffy, amorphous non-flowable material, amorphous free-flowing material, crystalline material, not readily compressed or crystalline material readily compressed. For example if the material is a fluffy powder such as magnesium carbonate or a crystalline material not readily compressed such as amobarbital, acetophenetidin or sodium bicarbonate a 1 to 1 ratio of active ingredient to basic granulation is advantageous. When an amorphous free-flowing material such as calcium phosphate, tri-basic is used 2 parts of active ingredient to one part of basic granulation is used. If the powder is an amorphous non-flowing material such as penicillin, digitalis or opium 1 part of active ingredient to two parts of basic granulation is desirable. When a crystalline material readily compressed such as sodium chloride, potassium bromide or ammonium bromide is employed the ratio of active ingredient to basic granulation can be 5 to 1.

The invention will be further clarified by the following specific examples.

EXAMPLE 1

| Ingredients: | Amount gms. |
| --- | --- |
| Calcium sulfate dihydrate | 49.50 |
| Polyvinyl alcohol | 2.75 |
| Carboxymethylcellulose acid | 2.75 |
| Water | 45.00 |

*Preparation of Slurry*

The water is placed in a stainless steel container. Using a propeller type mixer the polyvinyl alcohol is dissolved with constant agitation. While stirring, the carboxymethylcellulose acid is added and then the calcium sulfate dihydrate is added. The slurry is allowed to mix until homogeneous.

*Spray Drying of Slurry*

Using a co-current, centrifugal wheel atomizer (Nerco-Niro seven foot six inch model) spray dryer, the dryer is equilibrated with the inlet temperature at 750° F. and the outlet temperature at 215° F. Spray drying of the slurry is commenced at a rate of 175 pounds of water per hour with the outlet temperature being maintained by regulating the amount of slurry being pumped to the atomizing wheel. The atomizing wheel is revolved at a rate of eighteen thousand five hundred revolutions per minute. During the course of operation the inlet temperature is kept constant at 750° F., the outlet temperature at 215° F. and the atomizing wheel is kept constant at eighteen thousand five hundred revolutions per minute. The dried granulation which comprises of substantially spherical dry granules comprising calcium sulfate dihydrate and carboxmethylcellulose acid coated with polyvinyl alcohol is collected in a receiver at the bottom of the main chamber. The particle size of the granulation is from about 100 to 250 microns.

*Preparation of Tablets*

| Ingredients: | Mg./tab. |
|---|---|
| Chlorpromazine hydrochloride | 5.00 |
| Magnesium stearate | 1.00 |
| D & C Yellow #5 Lake | 1.35 |
| D & C Blue #1 Lake | 0.07 |
| Spray dried granulation (as prepared above) | 162.00 |

All the ingredients except the spray dried granulation are passed through a #60 U.S. standard screen and mixed well for ten minutes. The spray dried granulation is added and mixed for an additional ten minutes. The mixture is compressed on a single punch machine using $\%_{32}''$ flat face beveled edge punches and die.

EXAMPLE 2

| Ingredients: | Amount, gms. |
|---|---|
| Magnesium carbonate | 60.000 |
| Tragacanth | 4.000 |
| Guar gum | 0.250 |
| F D & C Yellow #5 | 0.030 |
| F D & C Blue #1 | 0.001 |
| Water | 35.719 |

*Preparation of Slurry*

The water is placed in a stainless steel container. A turbine or propeller type mixer is used to dissolve the F D & C Yellow #5 and F D & C Blue #1 in the water. The tragacanth is added with constant agitation. While stirring the guar gum is added and then the magnesium carbonate. The slurry is allowed to mix until homogeneous.

*Spray Drying of Slurry*

Using a co-current, centrifugal wheel atomizer (Nerco-Niro seven foot six inch model) spray dryer, the dryer is equilibrated with the inlet temperature at 700° F. and the outlet temperature at 225° F. Spray drying of the slurry is commenced with the outlet temperature being maintained by regulating the amount of slurry being pumped to the atomizing wheel. The atomizing wheel is revolved at a rate of eighteen thousand revolutions per minute. During the course of operation the inlet temperature is kept constant at 700° F., the outlet temperature at 225° F. and the atomizing wheel is kept constant at eighteen thousand revolutions per minute. The dried granulation which comprises of substantially spherical dry granules comprising magnesium carbonate and guar gum coated with tragacanth is collected in a receiver at the bottom of the main chamber. The particle size of the granulation is from about 100 to about 250 microns.

*Preparation of Tablets*

| Ingredients: | Mg./tab. |
|---|---|
| Trimeprazine tartrate | 6.26 |
| Magnesium stearate | 1.00 |
| Spray dried basic granulation (as prepared above) | 180.74 |

The trimeprazine tartrate is passed through a #60 U.S. standard screen and the basic granulation is added. The mixture is placed into a suitable mixer and is allowed to mix for 10 minutes. The mixer is stopped and the magnesium stearate is added, continue mixing for ten more minutes. The mixture is compressed on a Stokes Single Punch Model E Machine using $\%_{32}''$ flat face beveled edge punches and die.

EXAMPLE 3

| | Gms. |
|---|---|
| Calcium sulfate dihydrate | 49.50 |
| Polyvinyl alcohol | 2.75 |
| Carboxymethylcellulose acid | 2.75 |
| Water | 45.00 |

The polyvinylalcohol is dissolved in the water with agitation. The carboxymethylcellulose acid is added while stirring. Then the calcium sulfate dihydrate is added. The slurry is spray dried according to procedure of Example 2.

EXAMPLE 4

| | Gms. |
|---|---|
| Calcium sulfate dihydrate | 41.25 |
| Alginic acid | 7.00 |
| Acacia, powdered | 1.50 |
| Guar gum | .25 |
| Water | 50.00 |

Weigh the correct amount of water. Add the guar gum with agitation. Let mix until the thin gel forms. Add the acacia and continue to mix until it is dissolved. Then add the alginic acid and the calcium sulfate dihydrate. Mix until homogeneous. The slurry is spray dried following instructions of Example 2.

EXAMPLE 5

| | Gms. |
|---|---|
| Calcium sulfate dihydrate | 45.00 |
| Purified wood cellulose | 2.50 |
| Powdered gum arabic | 2.50 |
| Water | 50.00 |

Dissolve the powdered gum arabic in the water with agitation. Add the purified wood cellulose and then the calcium sulfate dihydrate. Mix until homogeneous. The slurry is spray dried according to procedure of Example 2.

EXAMPLE 6

| | Gms. |
|---|---|
| Precipitated calcium carbonate | 49.50 |
| Defatted wheat germ flour | 5.50 |
| Water | 45.00 |

Add the wheat germ flour to the water with agitation. Then add the precipitated calcium carbonate. Spray dry following procedure of Example 2.

Following are examples of typical slurries.

EXAMPLE 7

| | Gms. |
|---|---|
| Lactose | 60.00 |
| Alginic acid | 5.00 |
| Acacia, powdered | 1.75 |
| Guar gum | 0.25 |
| Water | 33.00 |

EXAMPLE 8

| | |
|---|---|
| Kaolin | 10.00 |
| Polyvinylpyrrolidone | 1.00 |
| Acid carboxymethylcellulose | 1.00 |
| Water | 88.00 |

EXAMPLE 9

| | |
|---|---|
| Barium sulfate | 25.00 |
| Acacia, powdered | 1.25 |
| Starch | 1.75 |
| Water | 72.00 |

EXAMPLE 10

| | |
|---|---|
| Magnesium carbonate | 65.00 |
| Tragacanth | 4.00 |
| Starch | 3.00 |
| Talcum | 1.00 |
| Water | 27.00 |

EXAMPLE 11

| | Gms. |
|---|---|
| Precipitated calcium carbonate | 46.00 |
| Alginic acid | 2.50 |
| Ethyl cellulose (low viscosity) | 1.50 |
| Alcohol (SDA #30) | 50.00 |

EXAMPLE 12

| | |
|---|---|
| Kaolin | 45.00 |
| Alginic acid | 3.50 |
| Ethyl hydroxy ethyl cellulose (low viscosity) | 1.50 |
| Ethylene dichloride | 50.00 |

EXAMPLE 13

| | |
|---|---|
| Calcium sulfate dihydrate | 45.00 |
| Alginic acid | 3.50 |
| Methocel 60 HG 25 cps | 1.50 |
| Benzene | 30.00 |
| Methanol | 20.00 |

EXAMPLE 14

| | |
|---|---|
| Powdered sucrose | 35.00 |
| Polyvinyl alcohol | 1.75 |
| Starch | 2.25 |
| Stearic acid | 1.00 |
| Water | 60.00 |

What is claimed is:

1. The method of making a basic tablet granulation of uniform particle size for subsequent combination with a medicament to form a tablet comprising spray drying a slurry comprising from about 50% to about 98% by weight of the total solids of a pharmaceutical filler, from about 1% to about 50% by weight of the total solids of a pharmaceutical disintegrant, from about 1% to about 20% by weight of the total solids of a pharmaceutical binder and a low boiling liquid vehicle.

2. The method of making a basic tablet granulation of uniform particle size for subsequent combination with a medicament to form a tablet comprising spray drying a slurry comprising from about 50% to about 98% by weight of the total solids of a pharmaceutical filler, from about 1% to about 50% by weight of the total solids of a pharmaceutical disintegrant, from about 1% to about 20% by weight of the total solids of a pharmaceutical binder and a low boiling liquid vehicle, the solids concentration of the slurry being from about 5% to about 75% w./w.

3. The method in accordance with claim 2 characterized in that the pharmaceutical filler is calcium sulfate dihydrate.

4. The method in accordance with claim 2 characterized in that the pharmaceutical disintegrant is alginic acid.

5. The method in accordance with claim 2 characterized in that the pharmaceutical binder is acacia.

6. The method in accordance with claim 2 characterized in that the low boiling liquid vehicle is water.

7. The method of making a pharmaceutical tablet comprising spray drying a slurry comprising from about 50% to about 98% by weight of the total solids of a pharmaceutical filler, from about 1% to about 50% by weight of the total solids of a pharmaceutical disintegrant, from about 1% to about 20% by weight of the total solids of a pharmaceutical binder and a low boiling liquid vehicle to obtain dry substantially sperical granules, mixing said granules with a powdered medicament and compressing to form a tablet.

8. A basic tablet granulation for subsequent combination with a medicament and made in accordance with the process of claim 1.

References Cited in the file of this patent

UNITED STATES PATENTS

| | | |
|---|---|---|
| 2,793,979 | Svedres | May 28, 1957 |
| 2,805,977 | Robinson et al. | Sept. 10, 1957 |
| 2,841,528 | Myhre | July 1, 1958 |
| 2,877,159 | Lachman et al. | Mar. 10, 1959 |
| 2,980,589 | De Grunigen | Apr. 18, 1961 |

OTHER REFERENCES

Remington's Practice of Pharmacy, 11th ed., Mack Publ. Co., Easton, Pa. (1956), pp. 124 and 374–377.

Scoville: The Art of Compounding, 9th ed., McGraw-Hill Book Co., New York (1957), pp. 94–95.

Tucker: J.A.P.A., Sci. Ed., vol. 48, No. 6, June 1959, page 362.